(12) United States Patent
Cong et al.

(10) Patent No.: US 10,483,772 B2
(45) Date of Patent: *Nov. 19, 2019

(54) SYSTEM AND METHOD FOR ELECTRIC VEHICLE WIRELESS CHARGER OUTPUT PROTECTION

(71) Applicant: LEAR CORPORATION, Southfield, MI (US)

(72) Inventors: Steven Cong, Novi, MI (US); David A. Hein, Sterling Heights, MI (US); Ryan Cleveland, Livonia, MI (US); Eric Salem, Berkley, MI (US)

(73) Assignee: LEAR CORPORATION, Southfield, MI (US)

( * ) Notice: Subject to any disclaimer, the term of this patent is extended or adjusted under 35 U.S.C. 154(b) by 134 days.

This patent is subject to a terminal disclaimer.

(21) Appl. No.: 15/801,851

(22) Filed: Nov. 2, 2017

(65) Prior Publication Data

US 2019/0131803 A1 May 2, 2019

(51) Int. Cl.
*H02J 7/00* (2006.01)
*B60L 53/20* (2019.01)
*B60L 53/12* (2019.01)
*B60L 53/66* (2019.01)

(52) U.S. Cl.
CPC ............ *H02J 7/0029* (2013.01); *B60L 53/12* (2019.02); *B60L 53/20* (2019.02); *B60L 53/665* (2019.02); *B60L 2210/30* (2013.01); *B60L 2210/40* (2013.01)

(58) Field of Classification Search
USPC .................................................. 320/108, 109
See application file for complete search history.

(56) References Cited

U.S. PATENT DOCUMENTS

| | | | |
|---|---|---|---|
| 2012/0043931 A1* | 2/2012 | Terao | H02J 7/025 320/108 |
| 2013/0270919 A1* | 10/2013 | Miller | H01F 38/14 307/104 |
| 2016/0089988 A1 | 3/2016 | Bartz et al. | |

* cited by examiner

*Primary Examiner* — Samuel Berhanu
(74) *Attorney, Agent, or Firm* — Brooks Kushman P.C.

(57) ABSTRACT

A wireless charger output protection system and method is provided for protecting a battery in an electric vehicle during wireless charging from both a desired power source and a stray power source. A wireless power transfer system includes a wireless charger on the electric vehicle side that receives power wirelessly from a charging base. The wireless charger output protection system and method shuts down the wireless charger output and dumps energy in a receive antenna (e.g., a vehicle pad) when a low-voltage battery connected to the wireless charger is lost. The wireless charger output protection system and method also shuts down the wireless charger output and dumps unwanted energy in the receive antenna (e.g., a vehicle pad) when power is transferred from a stray power source coupled to the receive antenna.

20 Claims, 4 Drawing Sheets

SYSTEM AND METHOD FOR ELECTRIC VEHICLE WIRELESS CHARGER OUTPUT PROTECTION

TECHNICAL FIELD

The present disclosure relates to an electric vehicle battery charging protection system.

BACKGROUND

Wireless power transfer systems enable power to be transferred wirelessly from a source to a load. Inductive power transfer is a non-radiative, or near-field, type of wireless power transfer. Inductive power transfer uses an oscillating current passing through a primary coil (i.e., a transmit antenna) of a source to generate an oscillating magnetic near-field that induces currents in a secondary coil (i.e., a receive antenna) of a load. The source includes a power converter having power transistor switches which switch at controllable times to convert power of the source into the oscillating current passing through the primary coil.

Inductive power transfer is performed to wirelessly charge a load, such a traction battery of an electric vehicle, using power from the source. In such wireless electric vehicle charging systems, the transmit antenna of the source is embedded in a "charging" mat and the receive antenna (and an associated rectifier) is embedded in a designated location of the vehicle. The inductive power transfer involves inductive coupling between the antennas. For inductive power transfer to be efficient, the spacing between the antennas must be relatively close within small offset tolerances.

Ideally, the receive antenna of the vehicle only receives power transferred from the transmit antenna in the charging mat. Practically, the receive antenna of the electric vehicle is an LC resonant circuit that can receive power from any inductive power source and transfer it to the traction battery if the signal frequency is close to LC resonant frequency of the receive antenna. Unexpected power from stray power sources can damage the traction battery. Much of the control electronics in a wireless charger on the vehicle side are only powered during normal charging by a low-voltage battery (e.g., by a 12-volt battery). Thus, the control electronics cannot disconnect the wireless charger output when a magnetic near-field signal is received from a stray power source. Moreover, during normal wireless charging, if low voltage battery is somehow disconnected from the wireless charger, and the control electronics lose power, wireless communication between the charger and the source will likewise be lost. Absent this wireless communication with the power source, effective control of the charging operation may be relinquished, potentially damaging the traction battery.

SUMMARY

One or more embodiments of the present disclosure relate to a vehicle charging unit having a wireless charger output protection system. The vehicle charging unit may include a powerline configured to transmit AC current induced in a receive antenna and a rectifier configured to rectify the AC current from the powerline into a DC current for charging a vehicle battery. The vehicle charging unit may further include a powerline switch, a sensor circuit, a control switch, and a monitoring circuit. The powerline switch may be connected to the powerline and configured to control electrical connection between the receive antenna and the rectifier. The sensor circuit may be configured to detect a powerline voltage and generate a control voltage signal using the powerline voltage. The monitoring circuit may be selectively connected to the powerline switch by the control switch. The monitoring circuit may be configured to output a switch control signal causing the powerline switch to change state responsive to the control voltage signal from the sensor circuit.

According to an embodiment, the control switch may be a MOSFET. Moreover, the powerline switch may be an insulated-gate bipolar transistor (IGBT) having a gate that is selectively connected to the monitoring circuit.

The monitoring circuit may be configured to be powered from the control voltage signal of the sensor circuit by the receive antenna during normal wireless charging of the vehicle battery caused by current induced in the receive antenna by a charging base. The control switch may be configured to be normally open during normal wireless charging of the vehicle battery and block the switch control signal from the monitoring circuit from reaching the powerline switch. The control switch may be configured to close when the low-voltage battery is disconnected from the monitoring circuit during normal wireless charging. The monitoring circuit may be further configured to wirelessly transmit a deactivation signal to the charging base to shut down an AC power source provided in the charging base.

The control switch may be configured to be closed when the monitoring circuit is in a sleep mode. The monitoring circuit may be configured to receive power from the control voltage signal of the sensor circuit when the powerline voltage detected by the sensor circuit is caused by current induced in the receive antenna from a stray power source.

The powerline switch may be configured to be closed upon receipt of the switch control signal. The powerline may include a positive powerline conductor and a negative powerline conductor. The sensor circuit may be connected to at least one of the positive powerline conductor and the negative powerline conductor. The powerline switch may include a positive powerline switch and a negative powerline switch, each connected to one of the positive powerline conductor and the negative powerline conductor. The positive powerline switch and the negative powerline switch may be both controlled by the same switch control signal from the monitoring circuit. Alternatively, the positive powerline switch and the negative powerline switch may be separately controlled by the monitoring circuit.

One or more additional embodiments of the present disclosure relate to a method for switching off a wireless charger output. The method may include detecting stray voltage on a powerline generated by AC current induced in the powerline from a stray power source; converting the stray voltage on the powerline into a control voltage signal; powering a monitoring circuit using the control voltage signal; and outputting, by the monitoring circuit, a switch control signal to a powerline switch causing the powerline switch to close and divert the AC current induced in the powerline to a ground in response to receiving power from the control voltage signal.

The powerline may be connected to a rectifier for rectifying AC current into a DC current for charging a vehicle battery during normal wireless charging. The step of outputting, by the monitoring circuit, a switch control signal to a powerline switch may comprise outputting the switch control signal to a negative powerline switch connected to a positive powerline conductor causing the negative powerline switch to close; and outputting the switch control signal to a positive powerline switch connected to a negative powerline conductor causing the positive powerline switch to close.

One or more additional embodiments of the present disclosure relate to a method for switching off a wireless charger output. The method may include rectifying AC current from a powerline into DC current for charging a vehicle battery, the AC current induced in a receive antenna by current in a transmit antenna from an AC power source in a charging base; generating a control voltage signal at a sensor circuit using current from the powerline; detecting loss of power, at a monitoring circuit, from a low-voltage battery; connecting the monitoring circuit to a powerline switch in response to detecting the loss of power from the low-voltage battery; and outputting, by the monitoring circuit, a switch control signal to the powerline switch causing the powerline switch to close and divert the current in the powerline to a ground in response to receiving power from the control voltage signal.

The method may further include transmitting, by the monitoring circuit, a wireless deactivation signal to the charging base to shut down the AC power source provided in the charging base in response to detecting the loss of power from the low-voltage battery. The step of connecting the monitoring circuit to the powerline switch may include closing a control switch between the powerline switch and the monitoring circuit in response to detecting the loss of power from the low-voltage battery. The step of outputting, by the monitoring circuit, a switch control signal to a powerline switch may include outputting the switch control signal to a negative powerline switch connected to a positive powerline conductor causing the negative powerline switch to close; and outputting the switch control signal to a positive powerline switch connected to a negative powerline conductor causing the positive powerline switch to close.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
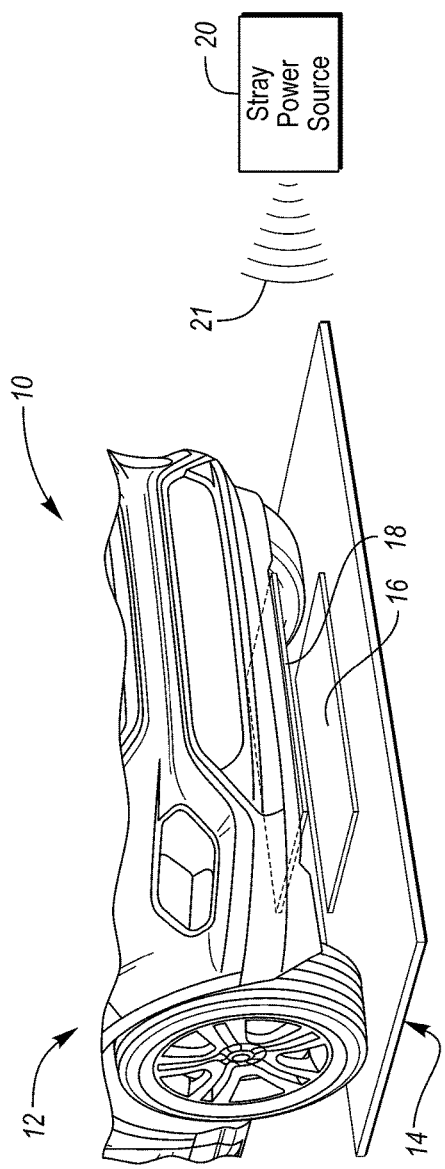
FIG. 1 illustrates a schematic diagram of an inductive power transfer system for wirelessly charging an electric vehicle with power from a charging base.

Referring now to FIG. 1, a schematic diagram of an inductive power transfer system 10 for wirelessly charging an electric vehicle 12 with power from a charging base 14 is shown. The charging base 14 includes a transmit antenna 16 positioned in the ground or on the floor of a structure. The transmit antenna 16 is sometimes referred to as a base pad or mat due to its physical configuration. The vehicle 12 includes a receive antenna 18, often referred to as a vehicle pad, mounted to the underside of the vehicle. The transmit antenna 16 and the receive antenna 18 are aligned in close arrangement when the vehicle 12 is properly parked. Power of charging base 14 can thus be transferred from the transmit antenna 16 to the receive antenna 18 for charging vehicle 12. The receive antenna 18 is connected to the traction battery or the like of the vehicle 12. The power wirelessly transferred from the charging base 14 to the vehicle 12 is used to charge the traction/vehicle battery during normal (i.e., expected) wireless charging.

When the vehicle 12 is parked and normal wireless charging is not expected, however, the receive antenna 18 may still receive electromagnetic power from sources other than the transmit antenna 16 of charging base 14. As illustrated in FIG. 1, a stray power source 20 (i.e., unwanted power source) located near the vehicle 12 may emit an electromagnetic signal 21. If the frequency of the electromagnetic signal 21 from the stray power source 20 is close to the resonant frequency of the receive antenna 18, it may transfer unwanted power to the receive antenna 18. Unexpected power wirelessly transferred from a stray power source 20 may damage the traction battery. As examples, the stray power source 20 may be a high-power inverter, lightning, another wireless charger not designed to charge the vehicle 12, and/or any device having electronic component that may emit electromagnetic signals.

Figure 2:
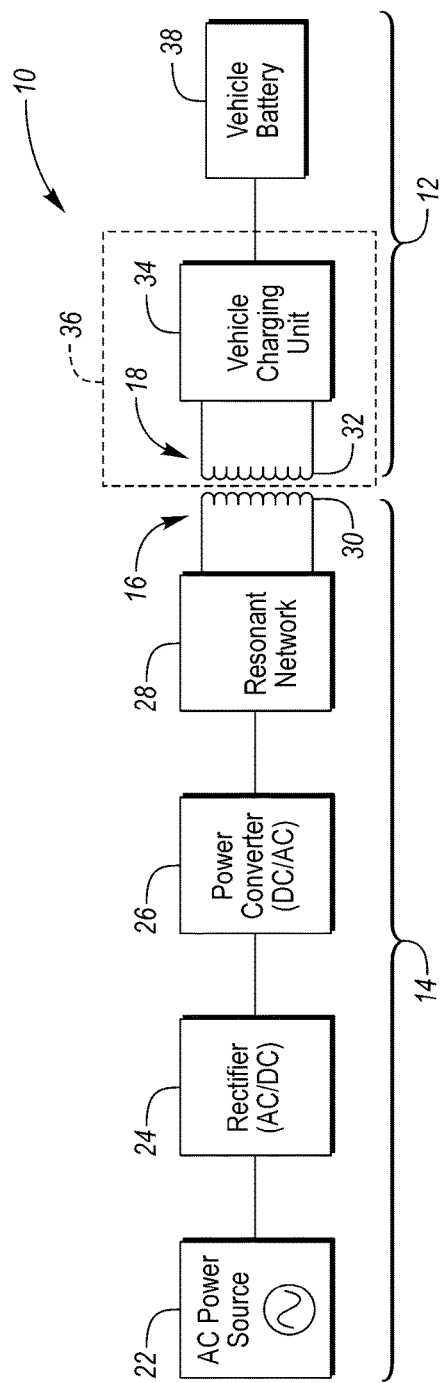
FIG. 2 illustrates a block diagram of an inductive power transfer system.

Referring now to FIG. 2, with continual reference to FIG. 1, a block diagram of the inductive power transfer system 10 is shown. As shown in FIG. 2, in addition to the transmit antenna 16, the charging base 14 of the inductive power transfer system 10 includes an AC power source 22, an AC/DC rectifier 24, a DC/AC power converter 26, and a resonant network 28. The AC power source 22 provides AC power to the rectifier 24. The rectifier 24 rectifies the AC power to DC power and provides the DC power to the power converter 26. The power converter 26 converts the DC power into AC power and provides the AC power to the resonant network 28.

The transmit antenna 16 includes one or more coils (i.e., primary coil 30). The receive antenna 18 of vehicle 12 includes one or more coils (i.e., secondary coil 32). The primary coil 30 and the secondary coil 32 are physically arranged next to one another (i.e., "loosely coupled") when the vehicle 12 is properly parked. That is, the secondary coil 32 wirelessly couples with the primary coil 30 when the secondary coil 32 is in the coupling-mode region of the primary coil 30 providing a mutual inductance M and resonating at substantially the same frequency as the primary coil 30. The AC power from the power converter 26 passes through the resonant network 28 and through the primary coil 30 and causes the primary coil 30 to generate an oscillating magnetic near-field. The oscillating magnetic near-field induces currents in the secondary coil 32. The currents in the secondary coil 32 generate AC power on the vehicle side. As such, an inductive coupling between the primary coil 30 and the secondary coil 32 occurs for inductive power transfer from the charging base 14 to the vehicle 12.

As further shown in FIG. 2, in addition to the receive antenna 18, the vehicle 12 may include a vehicle charging unit 34. Together, the receive antenna 18 and the vehicle charging unit 34 may be referred to as a wireless charger 36. The vehicle charging unit 34 delivers power to a load of the vehicle 12 such as a vehicle battery 38 (i.e. traction battery).

Figure 3:
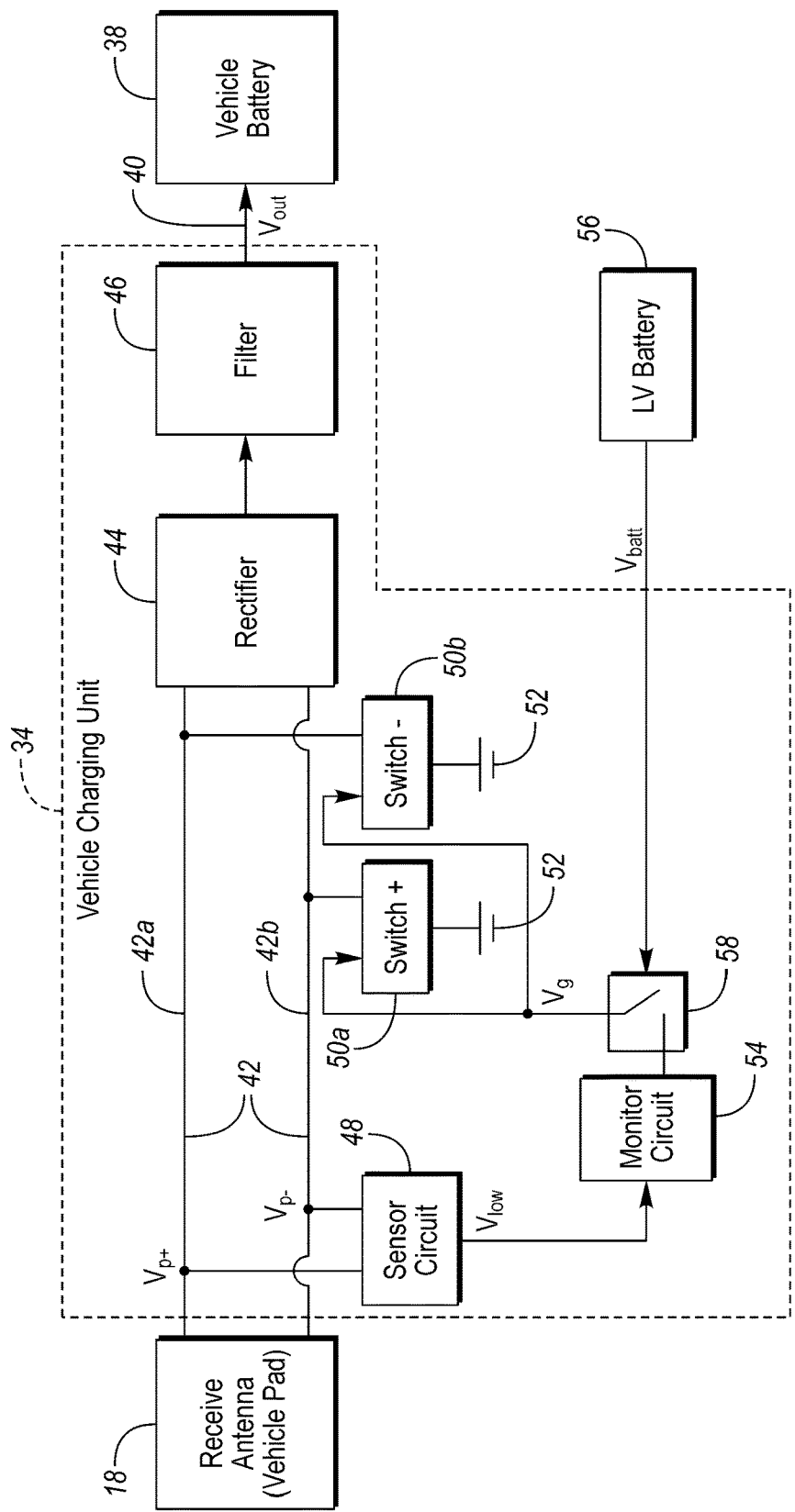
FIG. 3 illustrates a block diagram of wireless charger at the vehicle side having a vehicle charging unit according to one embodiment of the present disclosure.

FIG. 3 is a block diagram of the vehicle side of the inductive power transfer system illustrated in FIG. 2 illustrating the vehicle charging unit 34 in greater detail. As shown, the vehicle charging unit 34 may be connected to the vehicle battery 38 at a wireless charger output 40. As previously described, the currents induced in secondary coil 32 of the receive antenna 18 generate AC power on the vehicle side. The AC power is delivered to the vehicle charging unit 34 along a powerline 42. The vehicle charging unit 34 may include a rectifier 44 that rectifies the AC power into DC power. The DC power from the rectifier 44 may be supplied to the vehicle battery 38 through, for example, a filter 46. This DC power at the wireless charger output 40 charges the vehicle battery 38.

The powerline 42 may include a positive powerline conductor 42a for receiving the positive output from the receive antenna 18 and a negative powerline conductor 42b for receiving the negative output from the receive antenna. Together, positive powerline conductor 42a and the negative powerline conductor 42b deliver the AC power to the rectifier 44. Accordingly, during wireless charging, the positive powerline conductor 42a may receive a positive powerline conductor voltage $V_{p+}$ and the negative powerline conductor 42b may receive a negative powerline conductor voltage $V_{p-}$. The positive powerline conductor voltage $V_{p+}$ and the negative powerline conductor voltage $V_{p-}$ are half sine waves that are approximately 180 degrees out of phase.

The vehicle charging unit 34 may further include a sensor circuit 48 connected to the powerline 42 for detecting a powerline voltage. For example, the sensor circuit 48 may be connected to at least one of the positive powerline conductor 42a and the negative powerline conductor 42b to sense the receive antenna output voltage. Accordingly, the sensor circuit 48 may detect one or both the positive powerline conductor voltage $V_{p+}$ and the negative powerline conductor voltage $V_{p-}$ output by the receive antenna 18. The sensor circuit 48 may be further configured to generate a low-voltage output, referred to as a control voltage signal $V_{low}$, using the receive antenna output voltage sensed on the powerline 42. For example, the sensor circuit 48 may be configured to convert either the positive powerline conductor voltage $V_{p+}$ or the negative powerline conductor voltage $V_{p-}$ into the control voltage signal $V_{low}$.

The vehicle charging unit 34 may also include a powerline switch 50 connected to the powerline 42 configured to control electrical connection between the receive antenna 18 and the rectifier 44. With continuing reference to FIG. 3, the powerline switch 50 may include a pair of powerline switches, such as a positive powerline switch 50a and a negative powerline switch 50b. As shown, the positive powerline switch 50a may provide an ON/OFF connection between the negative powerline conductor 42b and ground 52. Similarly, the negative powerline switch 50b may provide and ON/OFF connection between the positive powerline conductor 42a and ground 52. During normal charging operation, the powerline switches 50a and 50b may be open and the positive powerline conductor 42a and negative powerline conductor 42b connect the receive antenna 18 to the rectifier 44. The wireless charger output 40 ($V_{out}$) to the vehicle battery 38 can be shut down by closing powerline switches 50a and 50b and providing a direct path to ground for the electrical energy in the powerline 42, effectively disconnecting the rectifier 44 from the receive antenna 18. According to an embodiment, each powerline switch 50 may be an IGBT (insulated gate bipolar transistor), though other types of switches may be employed such as a MOSFET (metal oxide semiconductor field effect transistor). The positive powerline switch 50a and the negative powerline switch 50b may be controlled by a monitoring circuit 54 using the control voltage signal $V_{low}$. The monitoring circuit 54 may be part of main controller of the vehicle charging unit 34 or may be a dedicated controller/control circuitry for controlling the state (i.e., open/close) of the powerline switches 50 in response to inputs received at the monitoring circuit 54.

During a normal wireless charging operation, the monitoring circuit 54 may receive power from the receive antenna 18 via the sensor circuit. Other control components of the vehicle charging unit 34 may receive power from a low-voltage battery 56 (e.g., a 12-volt lead-acid battery) of the vehicle 12. The vehicle charging unit 34 may communicate with the charging base 14 via near-field communication protocols such as WiFi, Bluetooth, etc. during such a normal wireless charging operation, including sending wireless communication signals to activate/deactivate the AC power source 22. When normal wireless charging is not being performed, control components of the vehicle charging unit 34 may enter a sleep mode and do not receive power from the low-voltage battery 56.

The monitoring circuit 54 may be selectively connected to the powerline switches 50 via a control switch 58. The control switch 58 may be controlled by the low-voltage battery 56. The control switch 58 may be open (i.e., OFF) during normal wireless charging when the low-voltage battery 56 is "ON" (i.e., $V_{batt}$ is high) disconnecting the monitoring circuit 54 from the powerline switches 50 (i.e., switches 50a and 50b are OFF or open). The control switch 58 may be forced closed in the absence of the low-voltage battery 56. For instance, the control switch 58 may close (i.e., turn ON), thereby connecting the monitoring circuit 54 to the powerline switches 50, when the low-voltage battery 56 is "OFF" ($V_{batt}$=0), e.g., when normal wireless charging is not occurring or when the monitoring circuit loses its connection to the low-voltage battery 56 during normal wireless charging. In either case, the sensor circuit 48 may provide the control voltage signal $V_{low}$ to the monitoring circuit 54. Under certain conditions, the control voltage signal $V_{low}$ may be used to control the powerline switches 50 in the absence of the low-voltage battery 56. According to an embodiment, the control switch 58 may be a MOSFET.

As previously described, the receive antenna 18 may receive electromagnetic signals 21 from unwanted sources, such as the stray power source 20. In such a case, the AC current induced in the receive antenna 18 due to the unwanted electromagnetic field may be rectified and charged into the vehicle battery 38 through the powerline 42, possibly causing damage to the battery and high power electronics. To avoid damage, the wireless charger output 40 to the vehicle battery 38 can be shut down by closing powerline switches 50a and 50b and providing a direct path to ground for the electrical energy in the powerline 42, effectively disconnecting the rectifier 44 from the receive antenna 18.

Thus, if an unwanted charging event occurs, the sensor circuit 48 may detect a powerline voltage generated by the stray power source 20 and convert the powerline voltage into a low-voltage output (i.e., control voltage signal $V_{low}$) that may be supplied to the monitoring circuit 54. Accordingly, with the control switch 58 closed, the unwanted electrical energy in the powerline 42 may be used to power the monitoring circuit 54 so that it may deliver a switch control signal $V_g$ closing the powerline switches 50 and shutting down the wireless charger output 40. The switch control signal $V_g$ may be triggered when the control voltage signal $V_{low}$ reaches a voltage threshold. Alternatively, in the case of IGBT switches, the switch control signal $V_g$ may track the control voltage signal $V_{low}$ and cause the powerline switches 50 to close when the gate voltage exceeds an IGBT switch threshold, providing a path to ground between the collector and emitter. This may quickly and effectively shut down the wireless charger output 40 to protect the vehicle battery 38 from damage due to unwanted AC current generated by the receive antenna 18. The monitoring circuit 54 may use the same switch control signal $V_g$ to control both the positive powerline switch 50a and the negative powerline switch 50b. Alternatively, the monitoring circuit 54 may output different switch control signals to the positive powerline switch 50a and the negative powerline switch 50b to control them separately.

As also previously described, during a normal wireless charging operation, the monitoring circuit 54 may receive power from the receive antenna 18 via the control voltage signal $V_{low}$ of the sensor circuit 48. If the low-voltage battery 56 is disconnected from the vehicle charging unit 34 during the normal charging operation, the vehicle charging unit 34 may be unable to communicate with the charging base 14 to stop the charging operation. Without wireless communication, proper control of the charging operation may be lost potentially causing damage to the vehicle battery 38. To prevent that from happening, the monitoring circuit 54 may be further configured to turn on (close) the powerline switches 50 to provide a path to ground for the electrical energy in the powerline 42, effectively disconnecting the rectifier 44 from the receive antenna 18, responsive to losing the low-voltage battery 56. When the low-voltage battery 56 is lost during normal wireless charging, the control switch 58 closes permitting the control voltage signal $V_{low}$, generated by the sensor circuit 48 using the powerline voltage, to control the powerline switches 50 via the monitoring circuit 54. That is, with the control switch 58 closed, the monitoring circuit 54 may deliver the switch control signal $V_g$ to the powerline switches 50 causing them to close. The monitoring circuit 54 may also transmit a wireless deactivation signal to the charging base 14 instructing the charging base 14 to shut down the AC power source 22.

Figure 4:
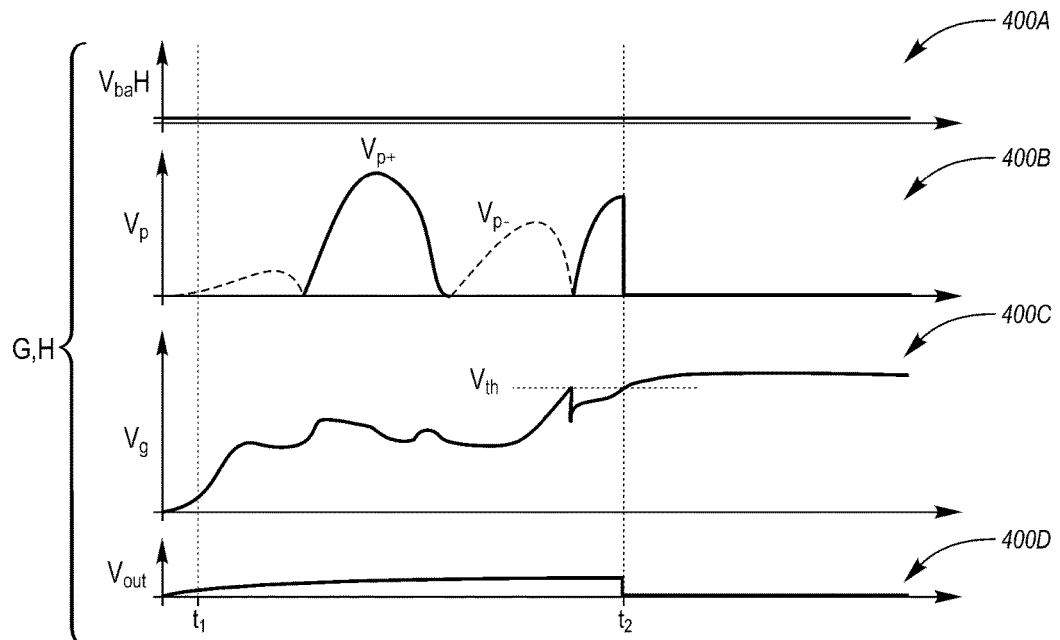
FIG. 4 illustrates plots of voltage waveforms of the powerline voltages and switch control signal of the wireless charging system according to one embodiment of the present disclosure.

FIG. 4 illustrates timing diagrams plotting an example of various voltage waveforms of the wireless charging system when the vehicle charging unit 34 receives power from a stray power source 20. Plot 400A illustrates the waveform of the low-voltage battery voltage $V_{batt}$ when the wireless charger is not operating to charge the vehicle battery 38. As shown, the low-voltage battery voltage is zero volts. Accordingly, the control switch 58 may be ON (i.e., closed).

Plot 400 B illustrates the waveforms of the positive powerline voltage $V_{p+}$ and the negative powerline voltage $V_{p-}$ interposed together. The solid line indicates the positive powerline voltage $V_{p+}$ while the dashed line indicates the negative powerline voltage $V_{p-}$. At time $t_1$, the receive antenna 18 may receive electromagnetic signals 21 from a source other than the transmit antenna 16, such as the stray power source 20, and starts to generate currents on the powerline 42. As an example, a negative powerline voltage $V_{p-}$ may appear on the negative powerline conductor 42b at $t_1$. The sensor circuit 48 may detect the negative powerline voltage $V_{p-}$ and generate the control voltage signal $V_{low}$ using the powerline voltage. The control voltage signal $V_{low}$ from the sensor circuit 48 may power the monitoring circuit 54.

As illustrated in plot 400C, responsive to receiving the control voltage signal $V_{low}$, the monitoring circuit 54 may start to generate a switch control signal $V_g$ at around $t_1$. It is noted that at $t_1$, the switch control signal $V_g$ may be below the threshold voltage $V_{th}$ of the powerline switch 50 and therefore unable to close the powerline switch 50 to effectively disconnect the powerline 42 from the rectifier 44. The voltage of the switch control signal $V_g$ may continue to ramp up while the stray power source 20 continues to induce unwanted current in the receive antenna 18. At time $t_2$, the switch control signal $V_g$ may be strong enough to close the powerline switches 50 (e.g., exceed the threshold voltage $V_{th}$ at the gate of the IGBT). With the powerline switches closed, the powerline conductors 42 are grounded at around $t_2$. Therefore, the vehicle battery 38 may be effectively disconnected from the receive antenna 18 and thus protected from unwanted power from the stray power source 20. Plot 400D illustrates the output voltage $V_{out}$ at the wireless charger output 40. As stray voltage appears on the powerline 42, the output voltage $V_{out}$ may climb until $t_2$ when the vehicle battery 38 is effectively disconnected from the receive antenna 18.

Figure 5:
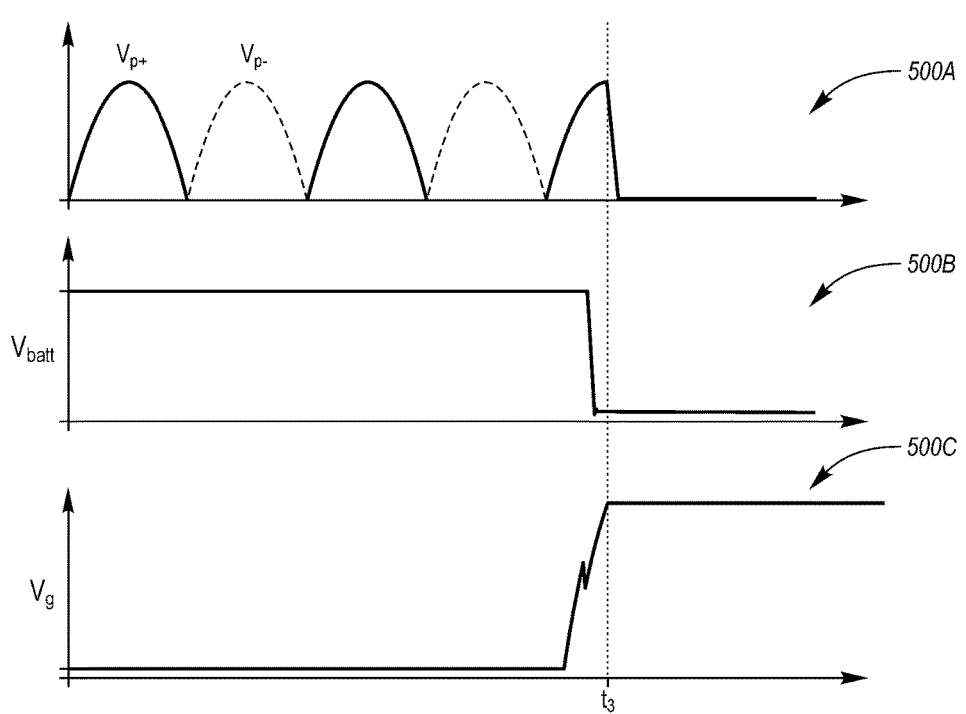
FIG. 5 illustrates plots of various voltage waveform at the vehicle side of the wireless charging system according to another embodiment of the present disclosure.

FIG. 5 illustrates timing diagrams plotting various voltage waveform at the vehicle side of the wireless charging system according to another embodiment of the present disclosure. Plot 500A illustrates the waveforms of the positive powerline voltage $V_{p+}$ and the negative powerline voltage $V_{p-}$ interposed together while the vehicle battery 38 is being charged under a normal charging operation. The solid line indicates the positive powerline voltage $V_{p+}$ while the dashed line indicates the negative powerline voltage $V_{p-}$. As an example, the powerline voltages $V_{p+}$ and $V_{p-}$ may be both half sine waves that are out of phase by approximately 180 degrees. Plot 500B illustrates the waveform of the low voltage battery voltage $V_{batt}$. During normal operation, the low voltage battery 56 (in FIG. 3) supplies the vehicle charging unit 34 the low voltage battery voltage $V_{batt}$ to power the control electronics. As shown at time $t_3$, the low voltage battery voltage $V_{batt}$ may drop to approximately zero volts indicative of the low voltage battery 56 being disconnected from the vehicle charging unit 34. Having lost the power supply from the low voltage battery 56, the vehicle charging unit 34 is unable to communicate with the charging base 14. To protect the vehicle battery 38 when this occurs, the monitoring circuit 54 may again be configured to shut off the wireless charger output 40 by closing the powerline switches 50. For example, when the power from the low-voltage battery 56 is lost, an on-board power supply (not shown) may hold its output voltage for a period of time (e.g., approximately 50 milliseconds). During this time, the vehicle charging unit 34 may transmit a wireless communication to the charging base 14 instructing the AC power source 22 to stop delivering power. Once the on-board power supply voltage drops to zero, the control switch 58 may be turned ON (i.e., closed), allowing the monitoring circuit 54 to control the powerline switches 50 in response to the control voltage signal $V_{low}$ from the sensor circuit 48. Based on the control voltage signal, the monitoring circuit 54 may output the switch control signal $V_g$, as illustrated in plot 500C, to the powerline switches 50, to close (turn on) the switches effectively grounding the powerline 42. Accordingly, the current induced in the receive antenna 18 may be diverted to the ground 52 through the powerline switches 50.

Figure 6:
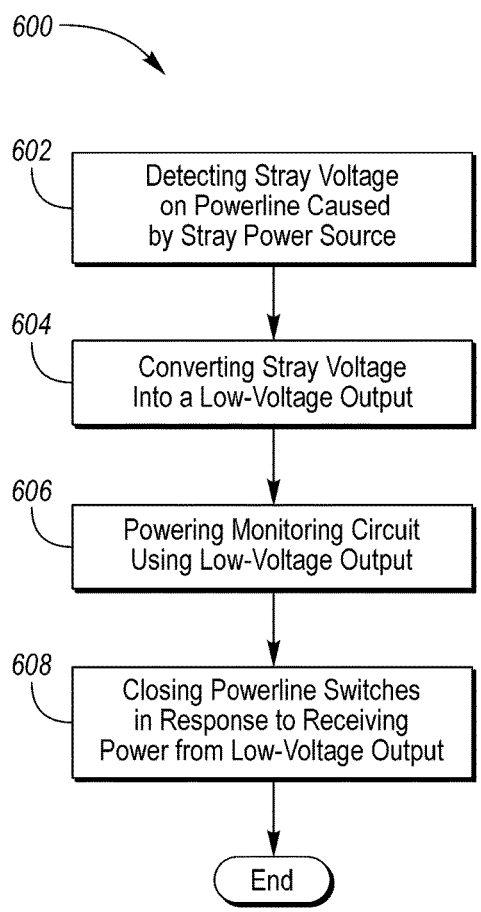
FIG. 6 illustrates a flowchart describing the operation of the method of the vehicle charging unit according to one embodiment of the present disclosure.

FIG. 6 is a flowchart illustrating a process 600 for switching off a wireless charger output when stray power is detected. At operation 602, the sensor circuit 48 of the vehicle charging unit 34 may detect unwanted voltage on the powerline 42 generated by AC current induced in the powerline from a stray power source 20. The unwanted voltage from the stray power source 20 may be detected when the vehicle charging unit 34 is in a sleep mode (i.e., the vehicle battery 38 is not being intentionally charged). At operation 604, the sensor circuit 48 may convert the unwanted voltage on the powerline 42 into a low-voltage output (i.e., control voltage signal $V_{low}$). The control voltage signal $V_{low}$ may be supplied to the monitoring circuit 54 to power the monitoring circuit 54, as provided at operation 606. At operation 608, the monitoring circuit 54 may output a switch control signal $V_g$ to a powerline switch 50 in response to receiving power from the control voltage signal $V_{low}$. For example, the monitoring circuit 54 may output the switch control signal $V_g$ to both the negative powerline switch 50b connected to the positive powerline conductor 42a and the positive powerline switch 50a connected to the negative powerline conductor 42b. The switch control signal $V_g$ may cause the powerline switches 50 to close and divert the AC current induced in the powerline 42 to a ground, effectively shutting down the wireless charger output 40.

Figure 7:
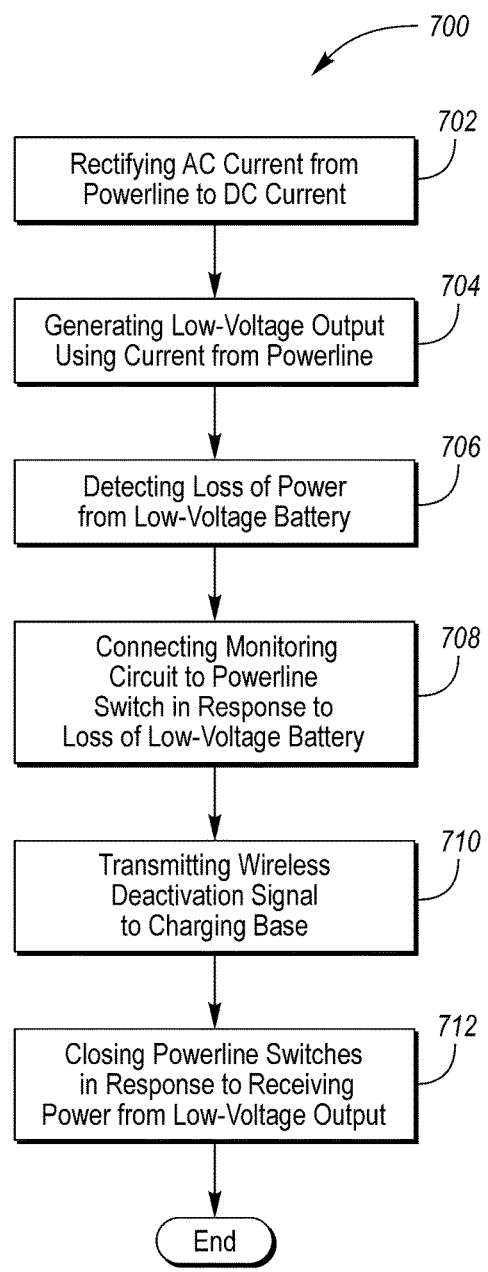
FIG. 7 illustrates a flowchart describing the operation of the method of the vehicle charging unit according to another embodiment of the present disclosure.

FIG. 7 is a flowchart illustrating a process 700 for switching off the wireless charger output 40 when the low-voltage battery 56 is disconnected from the vehicle charging unit 34 during normal wireless charging. During normal wireless charging, the AC power source 22 in the charging base 14 may provide current to the transmit antenna 16 for inducing AC current in the receive antenna 18, which is then provided to the powerline 42. At operation 702, the AC current in the powerline 42 may be rectified into DC current for charging the vehicle battery 38. At operation 704, the sensor circuit 48 may generate the control voltage signal $V_{low}$ using current from the powerline 42. During normal wireless charging, the control switch 58 between the powerline switches 50 and the monitoring circuit 54 may be open blocking the switch control signal $V_g$ from the monitoring circuit 54. The vehicle charging unit 34 may need power from the low-voltage battery 56 to control the charging operation. At operation 706, the vehicle charging unit 34 may detect a loss of power from the low-voltage battery 56. Upon detecting the loss of the low-voltage battery 56, the control switch 58 may be closed and the monitoring circuit 54 may control the powerline switches 50 using the control voltage signal $V_{low}$, as provided at operation 708. Moreover, at operation 710, the vehicle charging unit 34 (e.g., the monitoring circuit 54) may transmit a wireless deactivation signal to the charging base 14 to shut down the AC power source 22 in the charging base.

At operation 712, the monitoring circuit 54 may output a switch control signal $V_g$ to a powerline switch 50 in response to receiving power from the control voltage signal $V_{low}$. For example, the monitoring circuit 54 may output the switch control signal $V_g$ to both the negative powerline switch 50b connected to the positive powerline conductor 42a and the positive powerline switch 50a connected to the negative powerline conductor 42b. The switch control signal $V_g$ may cause the powerline switches to close and divert the AC current induced in the powerline 42 to a ground, effectively shutting down the wireless charger output 40.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A vehicle charging unit having a wireless charger output protection system comprising:
   a powerline configured to transmit AC current induced in a receive antenna;
   a rectifier configured to rectify the AC current from the powerline into a DC current for charging a vehicle battery;
   a powerline switch connected to the powerline configured to control electrical connection between the receive antenna and the rectifier;
   a sensor circuit configured to detect a powerline voltage and generate a control voltage signal using the powerline voltage;
   a control switch; and
   a monitoring circuit selectively connected to the powerline switch by the control switch, the monitoring circuit configured to output a switch control signal causing the powerline switch to change state responsive to the control voltage signal from the sensor circuit.

2. The vehicle charging unit of claim 1, wherein the control switch is a MOSFET.

3. The vehicle charging unit of claim 1, wherein the powerline switch comprises an insulated-gate bipolar transistor (IGBT) having a gate that is selectively connected to the monitoring circuit.

4. The vehicle charging unit of claim 1, wherein the monitoring circuit is configured to be powered from the control voltage signal of the sensor circuit by the receive antenna during normal wireless charging of the vehicle battery caused by current induced in the receive antenna by a charging base.

5. The vehicle charging unit of claim 4, wherein the control switch is configured to be normally open during normal wireless charging of the vehicle battery and block the switch control signal from the monitoring circuit from reaching the powerline switch.

6. The vehicle charging unit of claim 5, wherein the control switch is configured to close when the low-voltage battery is disconnected from the monitoring circuit during normal wireless charging.

7. The vehicle charging unit of claim 6, wherein the monitoring circuit is further configured to wirelessly transmit a deactivation signal to the charging base to shut down an AC power source provided in the charging base.

8. The vehicle charging unit of claim 5, wherein the control switch is configured to be closed when the monitoring circuit is in a sleep mode.

9. The vehicle charging unit of claim 8, wherein the monitoring circuit is configured to receive backup power from the control voltage signal of the sensor circuit when the powerline voltage detected by the sensor circuit is caused by current induced in the receive antenna from a stray power source.

10. The vehicle charging unit of claim 1, wherein the powerline switch is configured to be closed upon receipt of the switch control signal.

11. The vehicle charging unit of claim 10, wherein the powerline includes a positive powerline conductor and a negative powerline conductor,
the sensor circuit is connected to at least one of the positive powerline conductor and the negative powerline conductor, and
the powerline switch includes a positive powerline switch and a negative powerline switch each connected to one of the positive powerline conductor and the negative powerline conductor.

12. The vehicle charging unit of claim 11, wherein the positive powerline switch and the negative powerline switch are both controlled by the same switch control signal from the monitoring circuit.

13. The vehicle charging unit of claim 11, wherein the positive powerline switch and the negative powerline switch are separately controlled by the monitoring circuit.

14. A method for switching off a wireless charger output, comprising:
detecting stray voltage on a powerline generated by AC current induced in the powerline from a stray power source;
converting the stray voltage on the powerline into a control voltage signal;
powering a monitoring circuit using the control voltage signal; and
outputting, by the monitoring circuit, a switch control signal to a powerline switch causing the powerline switch to close and divert the AC current induced in the powerline to a ground in response to receiving power from the control voltage signal.

15. The method of claim 14, wherein the powerline is connected to a rectifier for rectifying AC current into a DC current for charging a vehicle battery during normal wireless charging.

16. The method of claim 14, wherein outputting, by the monitoring circuit, a switch control signal to a powerline switch comprises:
outputting the switch control signal to a negative powerline switch connected to a positive powerline conductor causing the negative powerline switch to close; and
outputting the switch control signal to a positive powerline switch connected to a negative powerline conductor causing the positive powerline switch to close.

17. A method for switching off a wireless charger output, comprising:
rectifying AC current from a powerline into DC current for charging a vehicle battery, the AC current induced in a receive antenna by current in a transmit antenna from an AC power source in a charging base;
generating a control voltage signal at a sensor circuit using current from the powerline;
detecting loss of power, at a monitoring circuit, from a low-voltage battery;
connecting the monitoring circuit to a powerline switch in response to detecting the loss of power from the low-voltage battery; and
outputting, by the monitoring circuit, a switch control signal to the powerline switch causing the powerline switch to close and divert the current in the powerline to a ground in response to receiving power from the control voltage signal.

18. The method of claim 17, further comprising:
transmitting, by the monitoring circuit, a wireless deactivation signal to the charging base to shut down the AC power source provided in the charging base in response to detecting the loss of power from the low-voltage battery.

19. The method of claim 17, wherein connecting the monitoring circuit to the powerline switch comprises:
closing a control switch between the powerline switch and the monitoring circuit in response to detecting the loss of power from the low-voltage battery.

20. The method of claim 17, wherein outputting, by the monitoring circuit, a switch control signal to a powerline switch comprises:
outputting the switch control signal to a negative powerline switch connected to a positive powerline conductor causing the negative powerline switch to close; and
outputting the switch control signal to a positive powerline switch connected to a negative powerline conductor causing the positive powerline switch to close.

* * * * *